June 17, 1930.                    W. F. RICHARDS                    1,764,983
BAFFLE
Filed Dec. 7, 1928
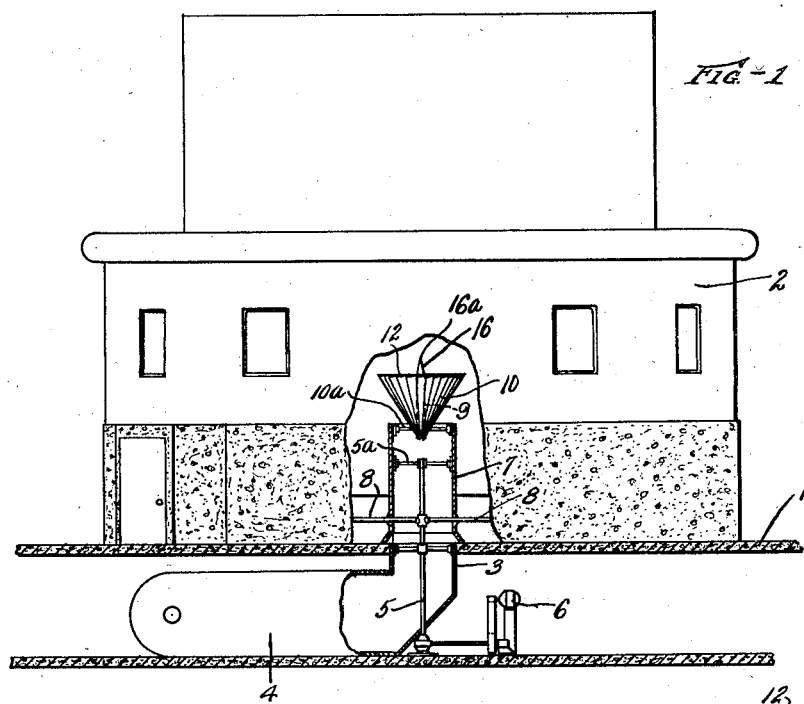
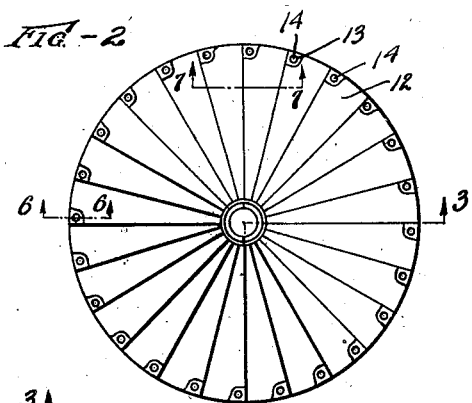
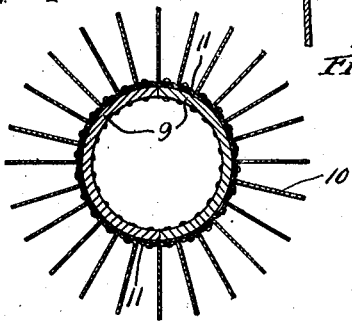
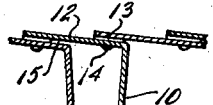
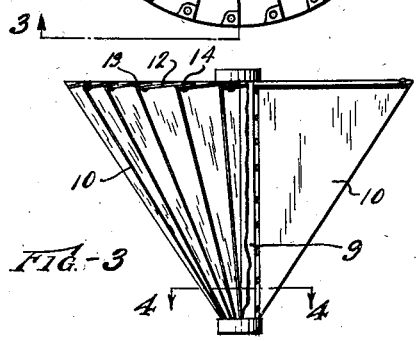
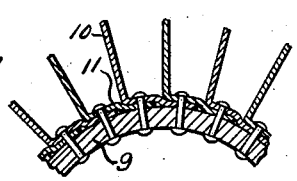
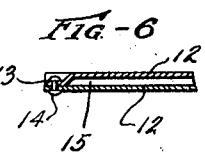
INVENTOR
WILLIAM F. RICHARDS
BY
Brockett Hyde, Higley + Meyer.
ATTORNEYS Patented June 17, 1930

1,764,983

UNITED STATES PATENT OFFICE

WILLIAM F. RICHARDS, OF MASON, MICHIGAN, ASSIGNOR TO THE LABORATORY PRODUCTS COMPANY, OF CLEVELAND, OHIO, A CORPORATION OF OHIO

BAFFLE

Application filed December 7, 1928. Serial No. 324,560.

This invention relates to liquid driers such as are used for drying various food products, including milk and its component parts, such as curd, alkaline, caseinates, milk sugar and the like.

Driers of this type usually include a cylindrical drying chamber into which the material is sprayed, with means for supplying heated air at substantially the center of the casing and other means for exhausting or withdrawing the air therefrom. It has been found that a very practical way to introduce the air into these driers is to provide them with a central flue in the floor, opening upward toward the material as it is being sprayed into the upper part of the casing. To prevent the passage of the products down through the flue a suitable baffle is provided and it has been found that these baffles collect deposits of the dried material. Since the heated air is passing around the baffle such materials are scorched or burned and mingle with the batch and contaminate it. Various types of baffles have been used to overcome this difficulty, with more or less success, but the present baffle is designed to avoid the deposit upon it of material by forming the baffle of a plurality of vanes or fins which direct the incoming heated air in such a way that it sweeps or wipes the exposed surfaces of the baffle and clears off any possible collection of material thereon.

The invention is clearly set forth in the arrangement shown in the following description, drawings and claims.

Referring to the drawings, Fig. 1 is a side elevation of the drier having parts broken away; Fig. 2 is a top plan view of the baffle; Fig. 3 is a side elevation partly in section and taken on the line 3—3 of Fig. 2; Fig. 4 is a section upon the line 4—4 of Fig. 3; Fig. 5 is a sectional view showing the mounting of the vanes at the center and being an enlargement of part of the arrangement shown in Fig. 4; Fig. 6 is a section upon the line 6—6 of Fig. 2; and Fig. 7 is a section upon the line 7—7 of Fig. 2 showing the spaced shingle arrangement of the upper fins.

In the embodiment set forth in the drawings, 1 represents the floor or base on which is mounted the drier generally indicated at 2. Through the floor of the drier extends a suitable flue 3 connected to a heated air supply generally indicated at 4. Extending upward through the flue 3 is a shaft 5 driven in any suitable manner, such as by a motor 6, and carrying a supplemental flue member 7 as well as the radial arms 8 for scrapers not shown. At the upper end of the shaft near the discharge mouth of the flue 7 is located the baffle structure forming the present invention. It comprises half tube portions 9 each of which carries a plurality of triangular shaped vanes or blades 10. Each of these blades is provided with an inner securing flange 11 riveted or otherwise secured as by soldering, brazing, or the like, to the half tube in such a way that the triangular blades extend vertically and generally form an inverted cone-shaped baffle. Each of these blades at its upper edge has a laterally extending triangular shaped fin 12, the fins of the several vanes overlapping in shingle-like manner and forming the base of the cone. Each of these fins is provided with a lug 13 extending from the edge thereof for securement to the upper face of the next adjacent fin. A rivet 14 serves to hold these parts together. The fins overlap, as stated, and they are spaced from each other between the lugs 13 and the central axis so as to provide radially and laterally extending discharge openings or slots 15 which direct the heated air passing up between each pair of adjacent blades 10 laterally over the upper face of the adjacent blades, so that the sweep of the air current across the upper surfaces wipes off and blows away any possible deposit of material upon the top of the baffle. In this way very little, if any, material is scorched or burned. If desired, the end of the half portions 9 may be protected by a small steep cover cone or shield 16 secured in place in any suitable manner and having at its apex an opening $16^a$.

The shaft 5 has connection with the flue 7 as by radially extending arms $5^a$. The lower extremity of the tube formed by the half portions 9 is above the upper extremity of the shaft 5, so that heated air may enter the tube. The baffle is secured with the flue 7 for rotation therewith by a number of arms 10ª secured with adjacent blades 10.

In operation the heated air rises through the flue 7, passes up between the blades 10 and is projected laterally by the fins over the surface of the adjacent fins into the drying chamber. The movement of the air is more or less tangential with some tendency to produce a spiral whirl, as will be readily apparent.

Having described my invention, I claim:

1. A baffle for the flues of spray driers, comprising a series of vertically disposed horizontally spaced blades, and fins carried by said blades and arranged in overlapping or shingle-like spaced relation, for preventing the collection of material upon the top of the baffle.

2. A baffle of the form described in claim 1, wherein said blades radiate from a central axis and widen upwardly to present a generally cone-shaped baffle, and said fins are formed by lateral extensions of the upper edge portions of said blades all extending in the same direction around the axis and directing the air across the faces of the fins.

3. A baffle of the class described, comprising means forming a series of upwardly extending channels, and a series of laterally extending fins mounted at the upper ends of said channels in successively overlapping shingle-like vertically spaced arrangement, to provide a series of slots to direct the air across the upper fin surfaces.

4. A baffle of the class described, comprising a frame constructed and arranged to form a series of upwardly extending channels, and baffling means obstructing the exit openings at the upper ends of said channels, said baffling means being provided with means for directing currents of air across the upper surface thereof to prevent the collection of material thereon.

In testimony whereof I hereby affix my signature.

WILLIAM F. RICHARDS.